Patented Feb. 14, 1939

2,146,884

UNITED STATES PATENT OFFICE 2,146,884

REFRIGERATION PROCESSES AND COMPOSITIONS

Herbert Wilkens Daudt, Wilmington, Del., assignor to Kinetic Chemicals, Incorporated, Wilmington, Del., a corporation of Delaware No Drawing. Application July 9, 1937, Serial No. 152,851

18 Claims. (Cl. 62—179)

This invention relates to refrigeration, more particularly it relates to refrigeration systems of the absorption type. Still more particularly it relates to absorption refrigeration systems in which fluorochloro aliphatic hydrocarbons are used as the refrigerant. The invention also relates to absorption liquids for fluorochloro hydrocarbons.

It is an object of this invention to provide new materials which can be used as absorbents in refrigeration cycles. A further object is to provide a non-toxic absorbent for refrigerants. A further object is to provide a non-inflammable absorbent for refrigerants. A still further object is to provide an absorbent which has good solubility properties. A still further object is to provide stable absorbents which have good solubility properties for fluorochloro hydrocarbons. Another object is to provide a chemically stable absorbent which is inert towards metal such as iron, steel, copper, bronze, brass, to moisture and to refrigerants particularly fluorohalohydrocarbons. Other objects include new refrigeration cycles and a general advancement of the art. Other objects will appear hereinafter.

In absorption refrigeration systems, cooling is generally produced by the evaporation of a liquid refrigerant, the vapors being absorbed in an absorbent material at a low pressure and liberated therefrom at a higher pressure. The liberated vapors are generally recondensed and returned to be re-evaporated. The absorbent material and the refrigerant are referred to as a refrigeration mixture or a working fluid.

In order that my invention may be understood, I will briefly describe a household type of refrigeration machine and cycle.

An evaporator around which the cooling is desired is connected to a vessel containing an absorbent for the refrigerant. The vessel is equipped with means for both cooling and heating the absorbent. The vapor space in the absorber is connected to a condensing coil which in turn is connected to the evaporator usually through a storage tank.

The operating cycle of this system is as follows:—The liquid refrigerant in the evaporator is caused to boil by connecting the cooled absorber. Because of the reduction in vapor pressure of the refrigerant when dissolved in the absorbent the evaporation will continue and the temperature in the evaporator will decrease until the vapor pressure of the refrigerant in the evaporator and absorber are the same. Any heat entering the evaporator will cause more vaporization, the vapor being continually absorbed. The vapor pressure of refrigerant in the absorber will increase as the refrigerant concentration in it increases. As soon as this pressure equals the vapor pressure of the refrigerant at the temperature desired in the evaporator the refrigerating effect ceases.

At this time the connection between the evaporator and absorber is closed and the latter connected through the condenser to the evaporator. The cooling water is shut off the absorber and heat applied. The absorbent is heated until the vapor pressure of the refrigerant is greater than that corresponding to the temperature of the condenser water. The refrigerant is thus driven from the absorbent, condensed at condenser temperature and returned to the evaporator. The cycle then repeats.

A number of variations of this process are used, particularly one in which separate vessels are used for absorption and desorption, the absorbent being pumped back and forth. A number of types of absorption systems in which my invention is useful is described in Refrigeration engineering vol. 17, pp. 136 et seq. (1929).

The above and other objects are accomplished by using a hydrocarbon containing both fluorine and chlorine atoms and having a relatively high boiling point as an absorption solvent. The fluorine atoms of the compounds of my invention are joined to acyclic carbon atoms. The chlorine atoms may be attached to the same acyclic carbon atoms as the fluorine atoms or they may be attached to different acyclic atoms or they may be attached to cyclic carbon atoms. As examples of compounds which may be used in accordance with this invention are the chlorinated and fluorinated aliphatic hydrocarbons and the chlorinated and fluorinated alkyl benzenes particularly the methyl benzenes which have boiling points above 60° C. As specific examples of such compounds may be mentioned trifluoro trichloro ethane, difluoro tetra chloroethane, difluoro trichloroethane, difluorotetra chloropropane, fluorinated and chlorinated paraffin wax, benzodifluorochloride and ring chlorinated derivatives, dichlorobenzotrifluoride, and tetrachlorobenzo trifluoride. Mixtures may also be used.

These compounds may be prepared by generally known methods such as those described in U. S. Patents 1,967,244 and 2,005,706, and as described in copending application of Holt and Daudt, Serial No. 105,752. The fluorochloro paraffin may be prepared according to British Patent 443,340. The crude fluorination products described in these patents which are mixtures of compounds of various fluorine and chlorine content may likewise be used. Mixtures are especially useful since they have melting points below the pure constituents.

Compounds of the above type and particularly the aliphatic or acyclic hydrocarbons which contain at least as many halogen atoms as hydrogen atoms including those containing hydrogen atoms represent a preferred embodiment of this invention since they have low inflammable properties, are chemically stable and inert and possess other valuable properties. I also prefer compounds which are liquids although good results are obtained with solid compounds if they liquefy upon absorption of small amounts of refrigerants.

The boiling points of the compounds of the present invention should preferably be high. The minimum boiling point which is satisfactory depends to some extent upon the temperature range at which the refrigeration is to occur as well as depending upon the boiling point of the refrigerant and the total pressure under which the system is to operate. As a general rule, compounds having a boiling point which is above about 200° F. may be used. In a preferred embodiment compounds which are liquids under refrigerating conditions and have boiling points above 250° F. and more particularly above 300° F. are used. For example, when difluorodichloromethane is used as the refrigerant in a system operating at an evaporator temperature of 5° F. and condenser temperature of 86° F., the pressure in the system will generally vary between about 20 pounds per square inch and 110 pounds per square inch absolute. In such a system the boiling point of the absorbent should preferably be above 215° F. and the melting point below that of the cooling water or air. If, however, a refrigeration is to be effected at much lower temperatures, a lower boiling absorbent may be used.

The invention will be further understood but is not intended to be limited by the following examples:

*Example I*

An absorption type refrigeration machine was operated using a charge of approximately 20 lbs. of difluoro-tetra-chloro ethane as absorbent and about 5 lbs. of difluoro dichloro methane as the refrigerant. The evaporator was operated at 40° F. at the pressure of about 37 lbs. gauge, the absorber at about 85° F. at the same pressure. During the desorption part of the cycle the absorber was heated to 300° F., the condenser pressure obtained being about 90 lbs. gauge. Approximately 3 lbs. of the refrigerant, difluorodichloromethane, was recirculated per cycle.

Similar properties were obtained with the same absorbent and monofluorotrichloro methane and trifluoromonochloromethane as refrigerants.

*Example II*

The operation described in Example I was performed except that a dichlorobenzotrifluoride was substituted for the difluorotetrachloroethane. Essentially the same results described in Example I were obtained.

*Example III*

Same as Example I except a fluorinated and chlorinated paraffin prepared as described in British Patent 443,340 was substituted for the difluoro tetrachloroethane.

Similar results were obtained as described in Example I. Tetrachlorobenzotrifluoride can be substituted with equally good results.

This invention has the advantage that absorbents which are noninflammable are provided. It has the additional advantage that the compounds have good solubility properties for the fluorochloro hydrocarbon refrigerants. Because of the widespread use of the fluorochloro hydrocarbon refrigerants the present compositions have great utility in the art. This invention has the additional advantage that the absorbent reduces the vapor pressure of the refrigerant, when the latter dissolves, below that vapor pressure which corresponds to the temperature desired in the evaporator. A further advantage resides in the fact that the absorbents of this invention permit uniform distribution and rapid absorption of the refrigerant in the absorbent. Another advantage resides in the fact that the absorbents of my invention do not undergo a phase change during a refrigeration cycle, hence they are not carried over into a condenser. Other advantages are that the absorbents are noncorrosive, have high chemical stability and good heat transfer properties. As a safeguard against accident in the case of leakage from a refrigerator system, my absorbents have low toxicity and noninflammable properties, and are odorless.

As many apparent and widely different embodiments of this invention may be made without departing from the spirit thereof, it is to be understood that I do not limit myself to the foregoing examples and description except as indicated in the following claims.

I claim:

1. A refrigerant mixture comprising a high boiling halofluor hydrocarbon having at least one fluorine atom attached to an ancyclic carbon atom as an absorbent and a fluorine containing hydrocarbon refrigerant.

2. A refrigerant mixture comprising a liquid high boiling chlorofluoro hydrocarbon having at least one fluorine atom attached to an acyclic carbon atom as an absorbent and a fluorochloro hydrocarbon refrigerant.

3. A refrigerant mixture comprising a liquid chlorofluoro hydrocarbon having at least one fluorine atom attached to an acyclic carbon atom and a boiling point above 200° F. and a fluorochloro hydrocarbon refrigerant.

4. A refrigerant mixture comprising a liquid chlorofluoro hydrocarbon having at least one fluorine atom attached to an acyclic carbon atom and a boiling point above 200° F. and a fluorochloromethane as a refrrigerant.

5. A refrigerant mixture comprising a liquid chlorofluoro hydrocarbon having at least one fluorine atom attached to an acyclic carbon atom and a boiling point above 200° F. and difluorodichloromethane as a refrigerant.

6. A refrigerant mixture comprising a high boiling chlorofluoro hydrocarbon which contains at least as many halogen atoms as hydrogen atoms and having at least one fluorine atom attached to an acyclic carbon atom and a fluorochloro hydrocarbon refrigerant.

7. A refrigerant mixture comprising a liquid fluorochloro aliphatic hydrocarbon and a fluorine and chlorine containing hydrocarbon refrigerant.

8. A refrigerant mixture comprising a liquid chlorofluoro toluene having at least one fluorine atom attached to the acyclic carbon atom and a fluorine and chlorine containing hydrocarbon refrigerant.

9. The method of absorption refrigeration which consists in absorbing a fluorochlorohydrocarbon refrigerant in a high boiling chlorofluorohydrocarbon having at least one fluorine atom attached to an acyclic carbon atom as an absorbent, heating the absorbent to drive off refrigerant vapor, condensing said vapor, evaporating the condensed vapor in heat exchange relationship with a space to be cooled and reabsorbing the vapor in said absorbent.

10. The method of absorption refrigeration wherein a volatile refrigerant is evaporated from an absorbent, condensed, conducted to the vicinity of a body to be cooled, evaporated to cool said body and then reabsorbed, the step which comprises using a high boiling halofluorohydrocarboncarbon having at least one fluorine atom attached to an acyclic carbon atom as an absorbent.

11. A refrigerant mixture as set forth in claim 3 wherein the high boiling halofluoro hydrocarbon is dichlorobenzo-trifluoride.

12. A refrigerant mixture as set forth in claim 3 wherein the high boiling halofluoro hydrocarbon is difluorotetrachloroethane.

13. A refrigerant mixture as set forth in claim 3 wherein the high boiling halofluoro hydrocarbon is difluorotetrachloropropane.

14. A refrigerant mixture as set forth in claim 3 wherein the fluorochloro hydrocarbon refrigerant is difluorodichloromethane.

15. A refrigerant mixture as set forth in claim 3 wherein the fluorochloro hydrocarbon refrigerant is monofluorotrichloromethane.

16. A refrigerant mixture as set forth in claim 3 wherein the fluorochloro hydrocarbon refrigerant is trifluoromonochloromethane.

17. A refrigerant mixture as set forth in claim 3 wherein the high boiling halofluoro hydrocarbon is dichlorobenzo trifluoride and the refrigerant is difluorodichloromethane.

18. A refrigerant mixture as set forth in claim 3 wherein the high boiling halofluoro hydrocarbon is difluorotetrachloroethane and the refrigerant is monofluorotrichloromethane.

HERBERT WILKENS DAUDT.

CERTIFICATE OF CORRECTION.

Patent No. 2,146,884. February 14, 1939.

HERBERT WILKENS DAUDT.

It is hereby certified that error appears in the printed specification of the above numbered patent requiring correction as follows: Page 1, second column, line 24-25, for the word "engineering" read Engineering; page 2, second column, line 38, claim 1, for "ancyclic" read acyclic; line 55, claim 4, for "refrrigerant" read refrigerant; page 3, first column, line 16, claim 10, for "carboncarbon" read carbon; and that the said Letters Patent should be read with this correction therein that the same may conform to the record of the case in the Patent Office.

Signed and sealed this 4th day of April, A. D. 1939.

(Seal).

Henry Van Arsdale

Acting Commissioner of Patents.